(12) United States Patent
Powwarynn

(10) Patent No.: US 9,663,130 B2
(45) Date of Patent: May 30, 2017

(54) COMBINATION MOTORIZED WHEELED VEHICLE AND PORTABLE HAND TRUCK

(71) Applicant: Thomas Powwarynn, Los Angeles, CA (US)

(72) Inventor: Thomas Powwarynn, Los Angeles, CA (US)

( * ) Notice: Subject to any disclaimer, the term of this patent is extended or adjusted under 35 U.S.C. 154(b) by 0 days.

(21) Appl. No.: 14/886,553

(22) Filed: Oct. 19, 2015

(65) Prior Publication Data

US 2017/0106889 A1    Apr. 20, 2017

(51) Int. Cl.
B62B 1/12    (2006.01)
B62B 1/00    (2006.01)
B62B 1/26    (2006.01)

(52) U.S. Cl.
CPC .............. *B62B 1/125* (2013.01); *B62B 1/002* (2013.01); *B62B 1/266* (2013.01)

(58) Field of Classification Search
CPC .......... B62B 1/125; B62B 1/002; B62B 1/266
See application file for complete search history.

(56) References Cited

U.S. PATENT DOCUMENTS

| | | | | |
|---|---|---|---|---|
| 2,490,189 A | * | 12/1949 | Alexander | B62B 1/12 280/47.27 |
| 2,715,533 A | * | 8/1955 | Strausburg | B62B 1/12 188/19 |
| 3,314,494 A | | 4/1967 | Weitzner | |
| 3,578,353 A | * | 5/1971 | Lockhart | B62B 1/002 280/47.2 |
| 4,106,590 A | * | 8/1978 | Tarran | B62B 1/12 182/20 |
| 4,274,647 A | * | 6/1981 | Drake, Jr. | B62K 3/002 180/181 |
| 5,468,005 A | * | 11/1995 | Yang | B62B 1/12 280/40 |
| 5,820,146 A | * | 10/1998 | Van Ligten | B62B 5/0023 280/47.19 |
| 5,984,327 A | * | 11/1999 | Hsieh | A45C 13/385 280/38 |
| 6,053,514 A | * | 4/2000 | Su | B62B 1/12 280/40 |
| 6,460,866 B1 | * | 10/2002 | Altschul | A45F 4/02 150/159 |

(Continued)

*Primary Examiner* — Anne Marie Boehler
*Assistant Examiner* — Gabriela C Craciun
(74) *Attorney, Agent, or Firm* — Shifrin Patent Law; Dan Shifrin

(57) ABSTRACT

A hand truck is provided, comprising a frame, a pair of back wheels secured to a first edge of the frame, a nose plate hingedly secured to the first edge of the frame, a telescopic handle hingedly secured to a second edge of the frame opposite the first edge, and a motorized wheel assembly separately connected to the second edge of the frame and to the handle. The hand truck has three configurations: a hand truck configuration whereby the nose plate is in a horizontal position, the frame is in a vertical position, and the handle is extended vertically; a storage configuration whereby the nose plate is in a vertical position, the frame is in a vertical position, and the handle is retracted; and a scooter configuration whereby the nose plate is in a horizontal position, the frame is in a horizontal position, and the handle is extended.

3 Claims, 11 Drawing Sheets

(56) References Cited

U.S. PATENT DOCUMENTS

| | | | | |
|---|---|---|---|---|
| 8,596,611 | B1* | 12/2013 | Fountain | B66F 9/19 254/2 R |
| 8,833,777 | B2 | 9/2014 | Turner et al. | |
| 9,199,655 | B1* | 12/2015 | Su | B62B 1/125 |
| 9,381,932 | B1* | 7/2016 | Giamanco | A45C 13/262 |
| 2002/0180184 | A1* | 12/2002 | Chang | B62B 1/125 280/652 |
| 2003/0062700 | A1* | 4/2003 | Stallbaumer | B62B 1/002 280/47.27 |
| 2004/0161321 | A1* | 8/2004 | Blake | B62B 1/002 414/444 |
| 2005/0127625 | A1* | 6/2005 | Zimmer | B62B 1/125 280/47.27 |
| 2008/0197590 | A1* | 8/2008 | Tsai | B62B 1/002 280/47.18 |
| 2010/0253025 | A1* | 10/2010 | Smith | B62B 1/12 280/47.27 |
| 2014/0238799 | A1* | 8/2014 | Sharma | B62B 1/125 190/11 |
| 2015/0197305 | A1 | 7/2015 | Boes | |
| 2015/0284016 | A1* | 10/2015 | Berlinger | B62B 1/002 280/47.18 |
| 2016/0023349 | A1* | 1/2016 | Hoppe | A45C 7/0045 280/655.1 |
| 2016/0031463 | A1* | 2/2016 | Weaver | B62B 1/264 280/659 |
| 2016/0114822 | A1* | 4/2016 | Liang | B62B 1/125 280/47.28 |
| 2016/0131303 | A1* | 5/2016 | Hubbs | F16M 11/42 280/30 |

\* cited by examiner

COMBINATION MOTORIZED WHEELED VEHICLE AND PORTABLE HAND TRUCK

TECHNICAL FIELD

The present invention relates generally to hand trucks for carrying articles and, in particular, to a combination foldable hand truck and motorized scooter.

BACKGROUND ART

Hand trucks are designed for transporting heavy articles, and portable hand trucks can be folded for storage and transportation when not in use. Although they are more compact and easy for user to transport, they remain a burden for users to carry around when not in use.

SUMMARY OF THE INVENTION

Embodiments of the present invention provide a hand truck, comprising a frame, a pair of back wheels secured to a first edge of the frame, a nose plate hingedly secured to the first edge of the frame, a telescopic handle hingedly secured to a second edge of the frame opposite the first edge, and a motorized wheel assembly separately connected to the second edge of the frame and to the handle. The hand truck has three configurations: a hand truck configuration whereby the nose plate is in a horizontal position, the frame is in a vertical position, and the handle is extended vertically; a storage configuration whereby the nose plate is in a vertical position, the frame is in a vertical position, and the handle is retracted; and a scooter configuration whereby the nose plate is in a horizontal position, the frame is in a horizontal position, and the handle is extended.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1A:
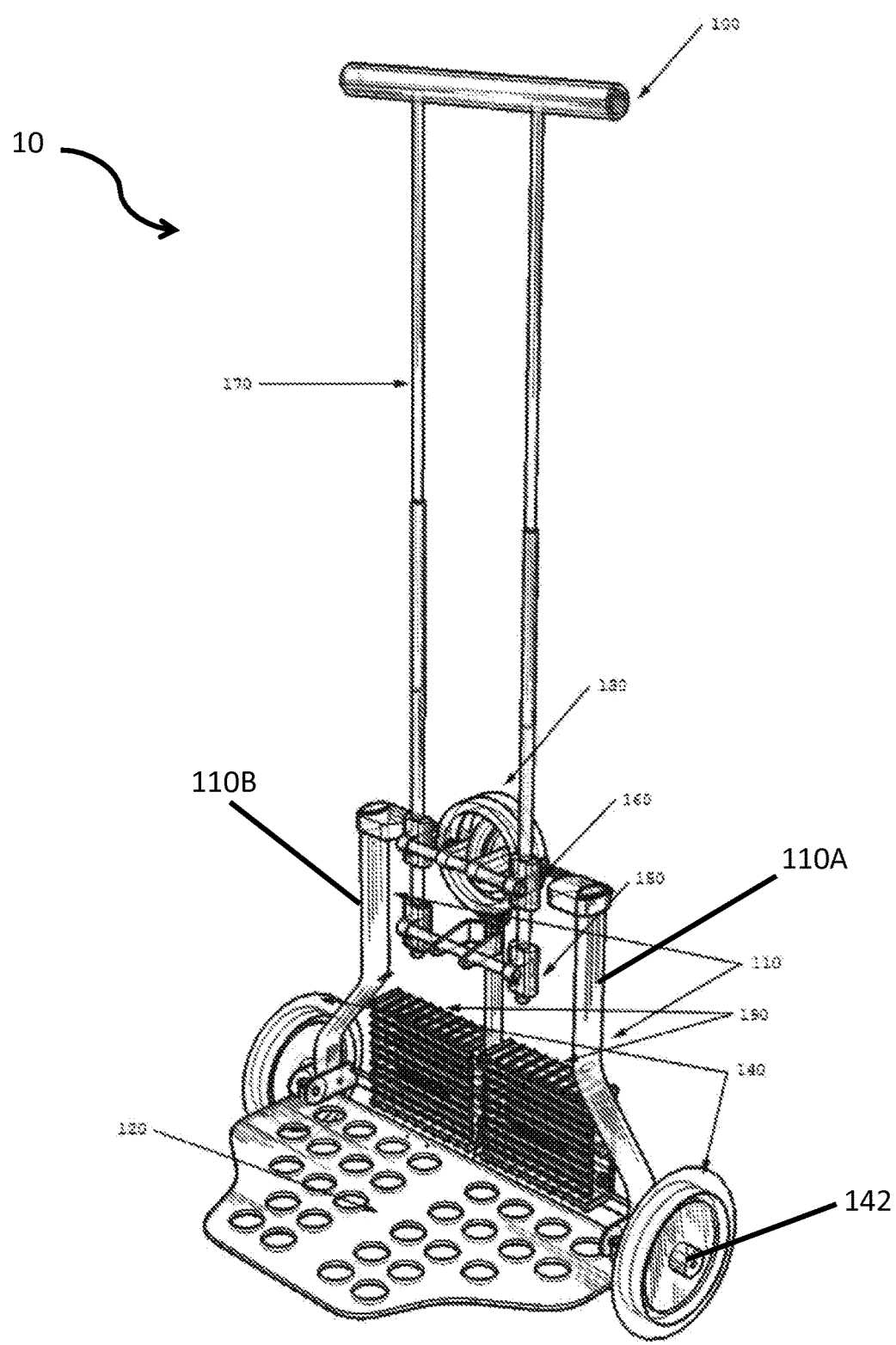
FIG. 1A is an isometric view of an embodiment of the hand truck of the present invention in a hand truck configuration.
Figure 1B:
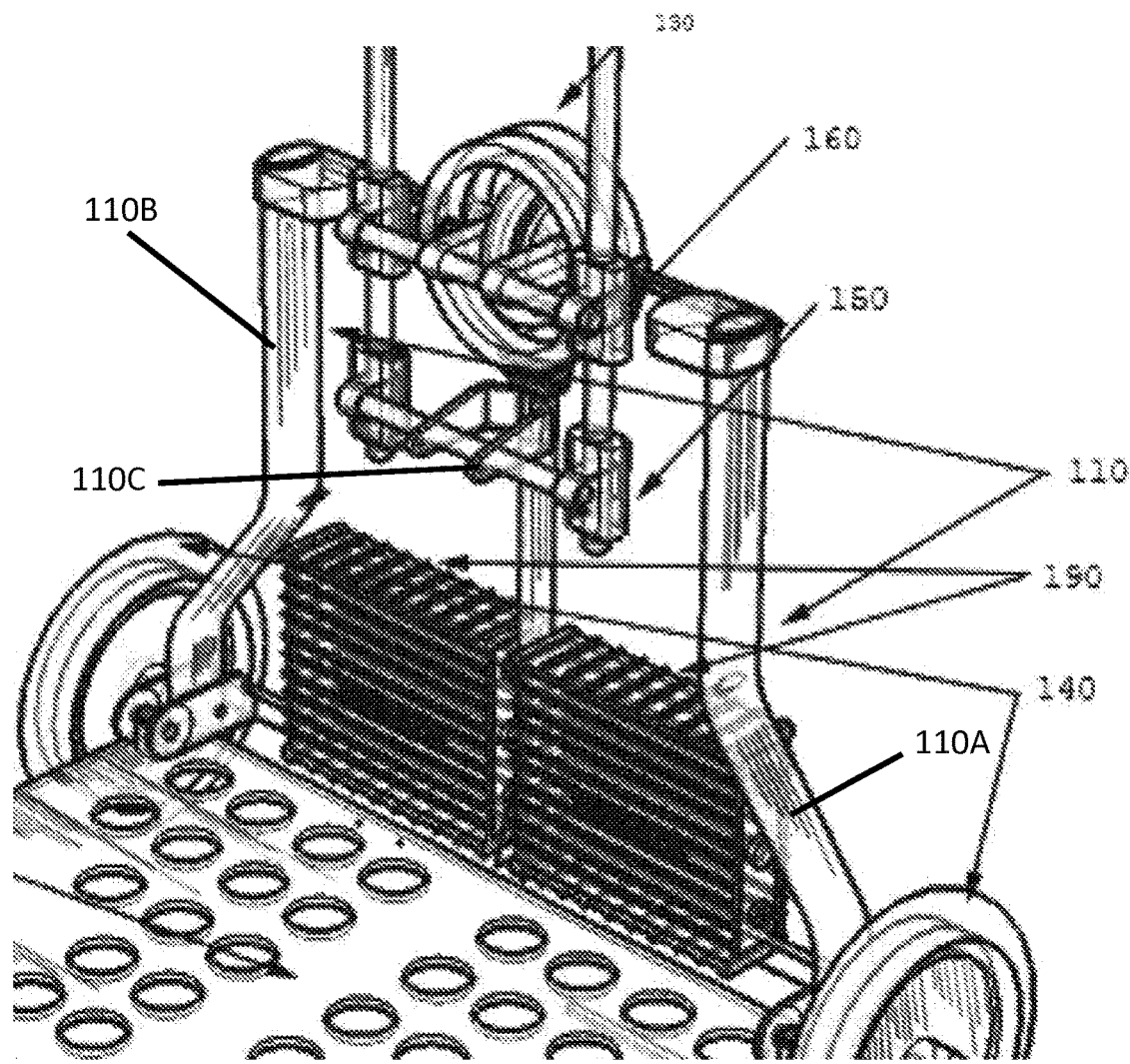
FIG. 1B is a close-up view of the frame of the hand truck of FIG. 1A.
Figure 4:
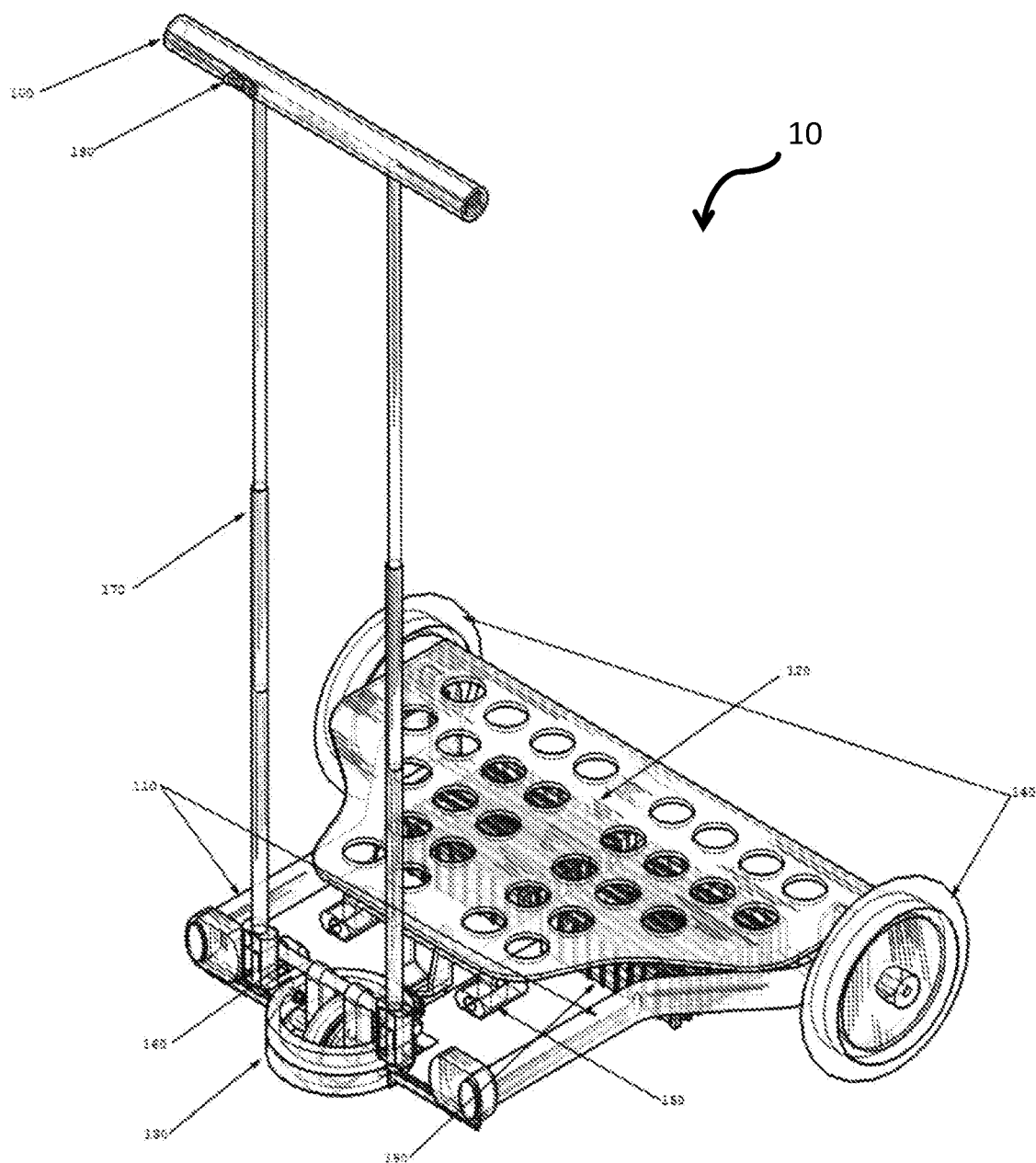
FIG. 4 is an isometric view of the hand truck of FIG. 1A in a scooter configuration.
Figure 5:
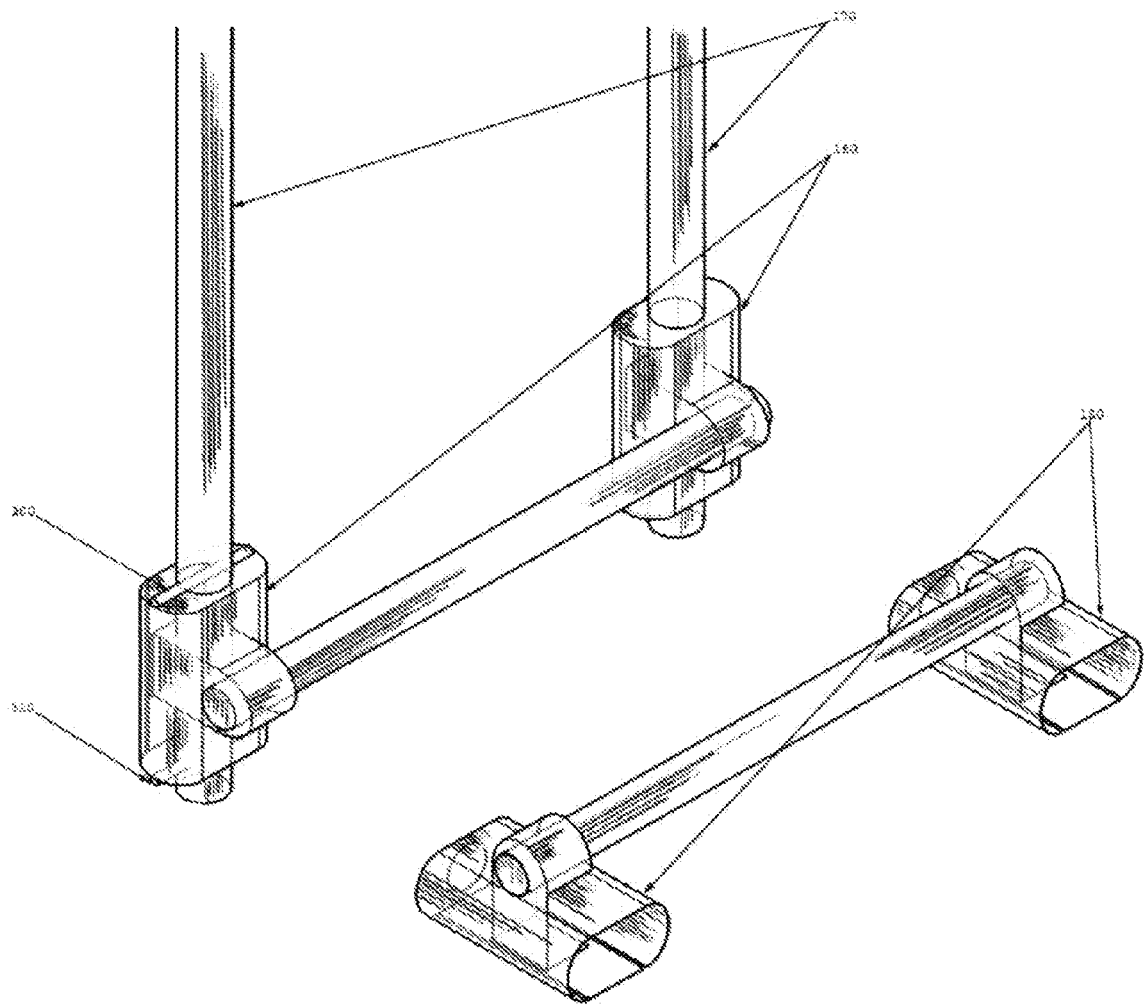
FIG. 5 is an isometric view of the handle bar of FIG. 1A locked in place to the upper frame support and tilted perpendicular to the frame.

Referring more particularly to the drawings, a representative embodiment of a hand truck or trolley 10 of the present invention is shown in FIG. 1A. The hand truck 10 includes a handle bar 100, a frame 110, a hinged nose plate 120, and back wheels 140 secured to an axle 142 at or near the bottom (as viewed in FIG. 1) edge of the frame 110. As illustrated in FIG. 1B, the frame 110 includes two side supports 110A, 110B with the axle 140A secured through the lower ends of the side supports. A set of upper handle supports 160 is rotatably connected at or near the top of the frame supports 110A, 110B and a set of lower handle supports 150 is affixed to the frame 110 with a bracket 110C below the upper handle supports 160. A pair of extension tubes of a telescopic handle 170 slide through the upper and lower handles supports 150, 160 to connect the telescopic handle 170 to the frame 110. The tubes are locked in place by upper and lower lock pins 300, 310 above and below at least one of the upper or lower handle supports 150, 160 (FIGS. 4 and 5). The handle bar 100 is connected across the top of the handle 170. The hand truck 10 also includes a front motorized wheel assembly 130 including a wheel 200 and an in-wheel motor 210.

Figure 2:
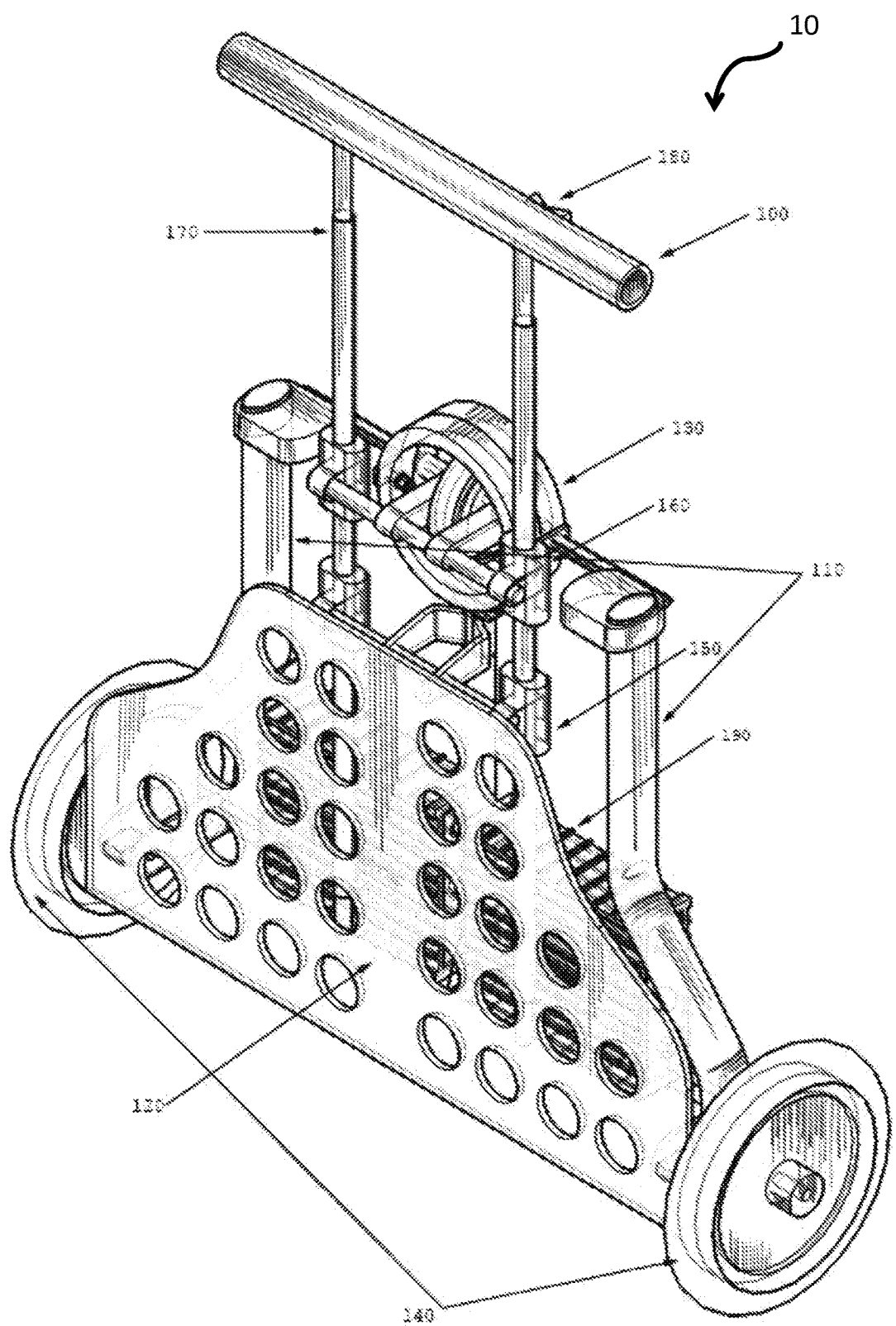
FIG. 2 is an isometric view of the hand truck of FIG. 1A in a storage or transport configuration.

The hand truck 10 is foldable from a conventional hand truck configuration (FIG. 1A) to a folded or storage configuration (FIG. 2). In the storage configuration, the nose plate 120 is folded up against the main body frame 110 with the telescopic handle 170 in a retracted position, also against the frame 110. In the truck configuration, hinges allow the nose plate 120 to be folded down approximately 90° away from the main body frame 110 with the telescopic handle 170 in a fully extended position.

Figure 3:
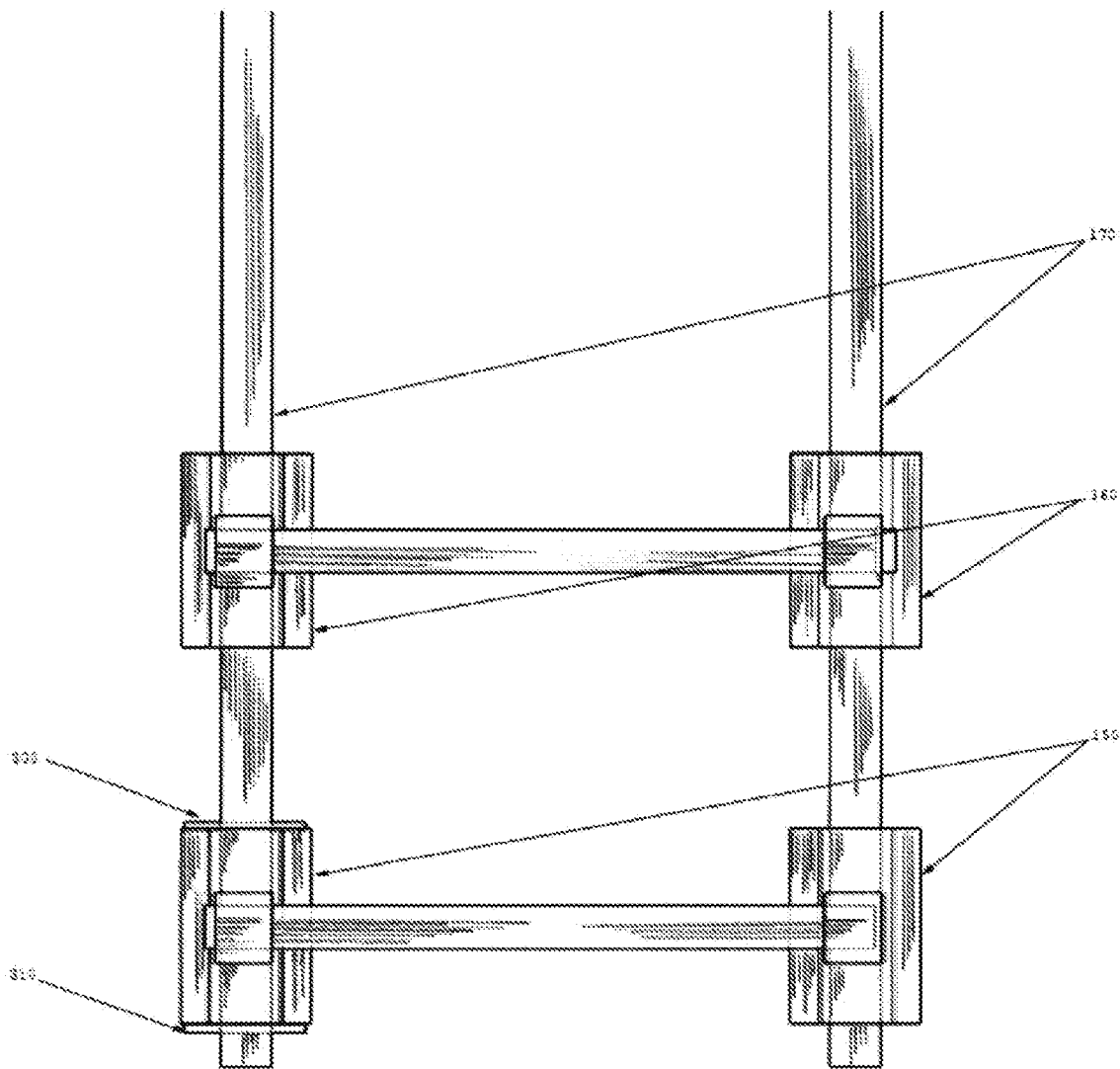
FIG. 3 is the front view of the handle bar of the hand truck of FIG. 1A locked in place to the upper and lower frame supports.

FIG. 3 illustrates a close-up front view of the telescopic handle 170 passed through the upper handle support 160 and the lower handle bar support 150 while in the hand truck configuration. The telescopic handle 170 is secured to the lower handle support 150 with the upper lock pin 300 and the lower lock pin 310. While in the hand truck configuration, the telescopic handle 170 functions as a spine, preventing the upper telescopic handle support 160 from tilting while connecting it to the lower telescopic handle support 150, which is statically secured to the main body frame 110.

The nose plate 120 may be made of aluminum strong enough to support up to about 140 kilograms (kg) in weight. The main body frame 110 is made of hollow aluminum strong enough support up to about 160 kg in weight. The back wheels 140 may be 10 inch solid rubber wheels with a nylon core. The center of the nylon core contains sealed ball bearings to provide smooth rolling operation with capacity of approximately 360 kg per wheel. The telescopic handle 170 may be made of two different diameters of thick wall aluminum tubing with maximum extension of about 150 centimeters (cm) and minimum contraction of about 75 cm. The telescopic handle 170 is capable of supporting up to about 70 kg of lateral weight while fully extended. It will be appreciated that the foregoing dimensions, weight capacities, and materials are merely representative of one embodiment are not meant to be limiting.

Referring again to FIG. 1A, the hand truck 10 is illustrated in the hand truck configuration. With the handle 170 in an upright position through and parallel to the frame 110, the nose plate 120 is folded outward approximately 90° away from the main body frame 110 to a substantially horizontal position. The telescopic handle 170 is extended upward but not beyond the lower and upper handle supports 150, 160. In this position, the telescopic handle 170 serves as a spine by holding and connecting the upper handle support 160, which is part of the front motorized wheel assembly 130, and the lower handle support 150, which is statically secured to the main body frame 110. Thus, the lower handle support 150 prevents the handle from tilting away from the main body frame while in the hand truck configuration.

As illustrated in FIG. 1A, one or more rechargeable batteries 190 may be secured within the frame 110 and electrically coupled to the motor 210 and a switch 180, which may be mounted on the handle bar 100. If desired, the batteries 190 may include a quick-connect/disconnect coupling to facilitate changing batteries to extend the travel range.

FIG. 3 illustrates two locking pins, an upper locking pin 300 and a lower locking pin 310, that prevent the telescopic handle 170 slipping through the lower handle support 150 while the device 10 is being used as a hand truck. Although the upper and lower locking pins 300, 310 are illustrated as securing just one of the lower handle supports 150, it will be appreciated that an second locking pin may be used to secure the other lower handle support 150 and one or a pair of upper locking pins (not shown) may be used to secure the upper handle supports 160 for additional security. Both the upper handle support 160 and the lower handle support 150 may be made of aluminum with maximum lateral weight capacity of about 80 kg each.

FIG. 4 illustrates the hand truck 10 in a third, scooter configuration. The nose plate 120 is illustrated folded up against the main body frame 110. The upper and lower locking pins 300, 310 are removed from the lower handle support 150 and the lower end of the handle 170 is slid completely through the lower handle support 150. The upper and lower locking pins 300, 310 are re-inserted through the handle 170 to secure the lower end of the handle 170 to the upper handle support 160, as illustrated in FIG. 5. The upper handle support 160 can now be tilted independently from the lower handle support 150 and the telescopic handle 170 is now only connected to the upper telescopic handle support 160.

The telescopic handle 170 may now be rotated to a substantially vertical position perpendicular to the main body frame 110, which is parallel to the travel surface, and extended all the way, supported only by the upper handle support 160. The handle bar 100 and telescopic handle 170 are now functioning as a handle and a steer bar for the front motorized wheel assembly 130. The front motorized wheel assembly 130 can be controlled forward or backward by the electronic switch 180, which may be a simple on/off forward/reverse switch or may include speed control as well.

Figure 6:
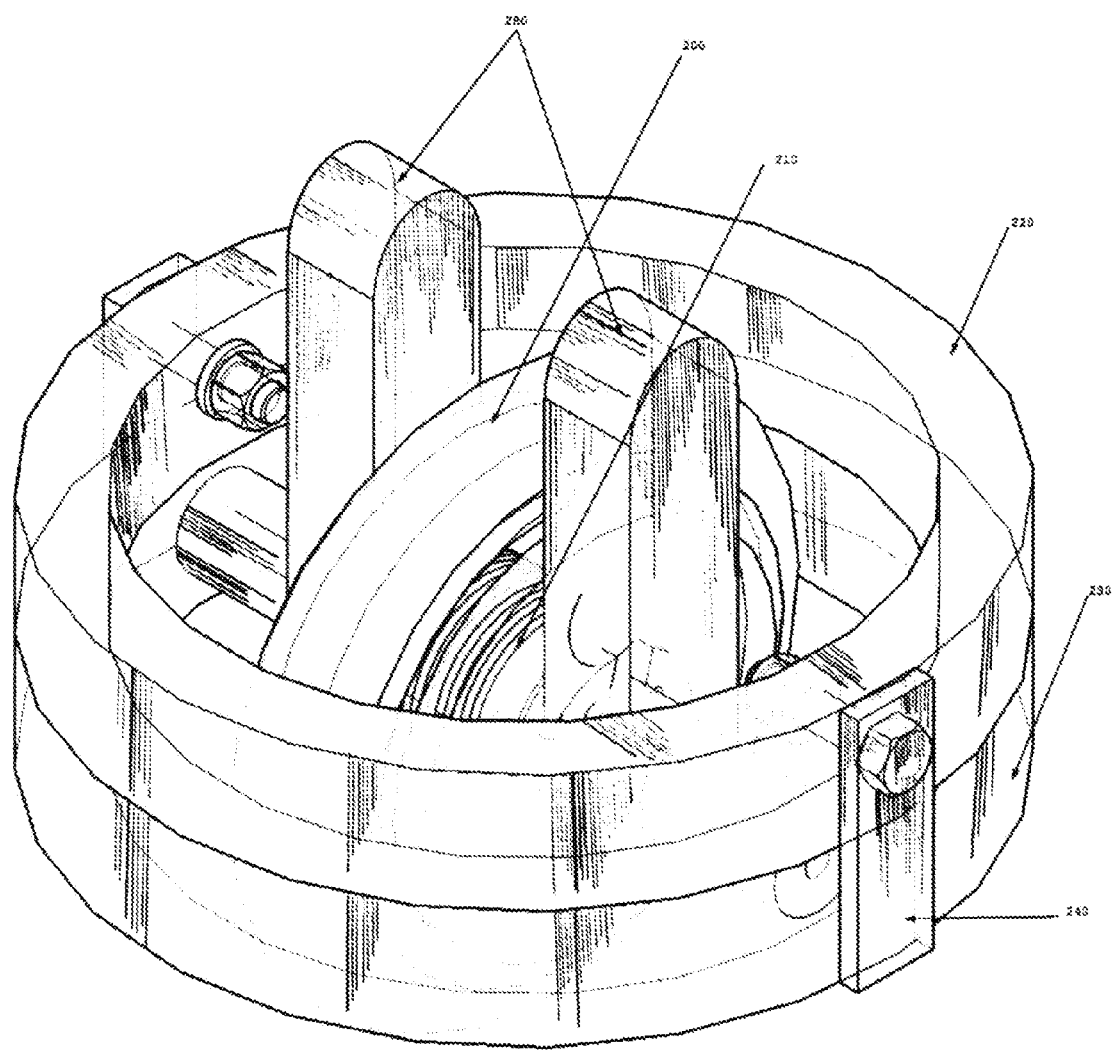
FIG. 6 is an isometric view of the front wheel of the hand truck of FIG. 1A with a motor embedded inside the wheel.
Figure 7:
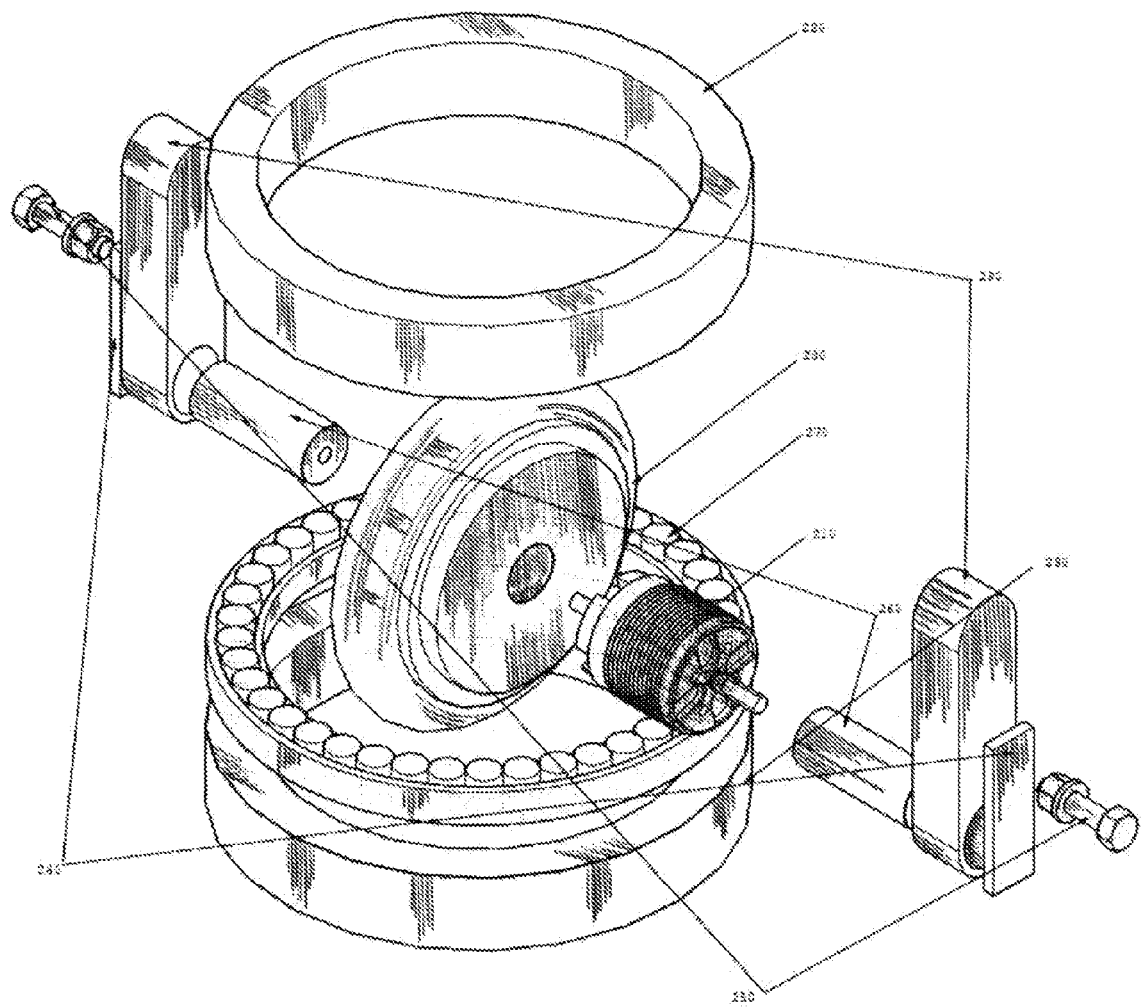
FIG. 7 is an exploded view of the front motorized wheel of FIG. 6.

FIG. 6 shows a close-up view of the front motorized wheel assembly 130 and FIG. 7 shows an exploded view of the front motorized wheel assembly 130. A bearing assembly 270 is inserted between a top bearing cup 220 and a lower bearing cup 230. The upper bearing cup 220 is attached statically to the main body frame 110 via connecting aluminum plates 240 which are both held together by two set of nuts and bolts 250. The bottom bearing cup 220 is connected to the upper handle support 160 via aluminum wheel forks 280, allowing the wheel 200 to be steered independently from the main body frame 110. The bottom bearing cup 220 is statically attached to an in-wheel motor 210 and the wheel 200 via an aluminum circular shaft that runs through aluminum wheel forks 280 to provide support to the front section of the main body frame 110 and direction control for the handle bar 100 while in the scooter configuration.

In the scooter configuration, a person may stand on the nose plate 120, folded against and supported by the frame 110, activate and control the motor 210 with the switch 180, and drive the hand truck 10 using the handle 170 and handle bar 100 to steer the wheel assembly 130.

Figure 8:
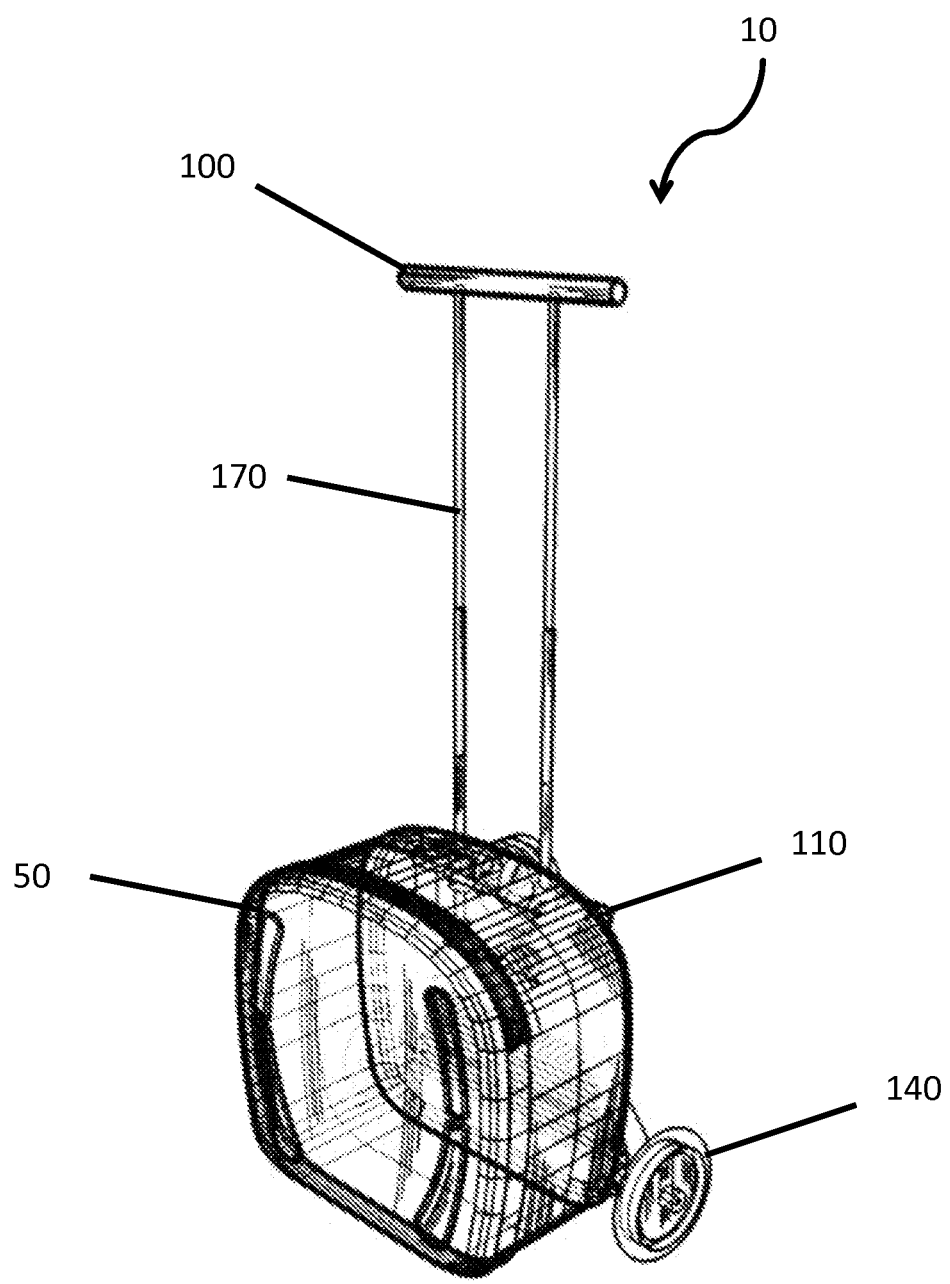
FIG. 8 illustrates the hand truck of FIG. 1A with a luggage bag attached and the handle fully extended.
Figure 9:
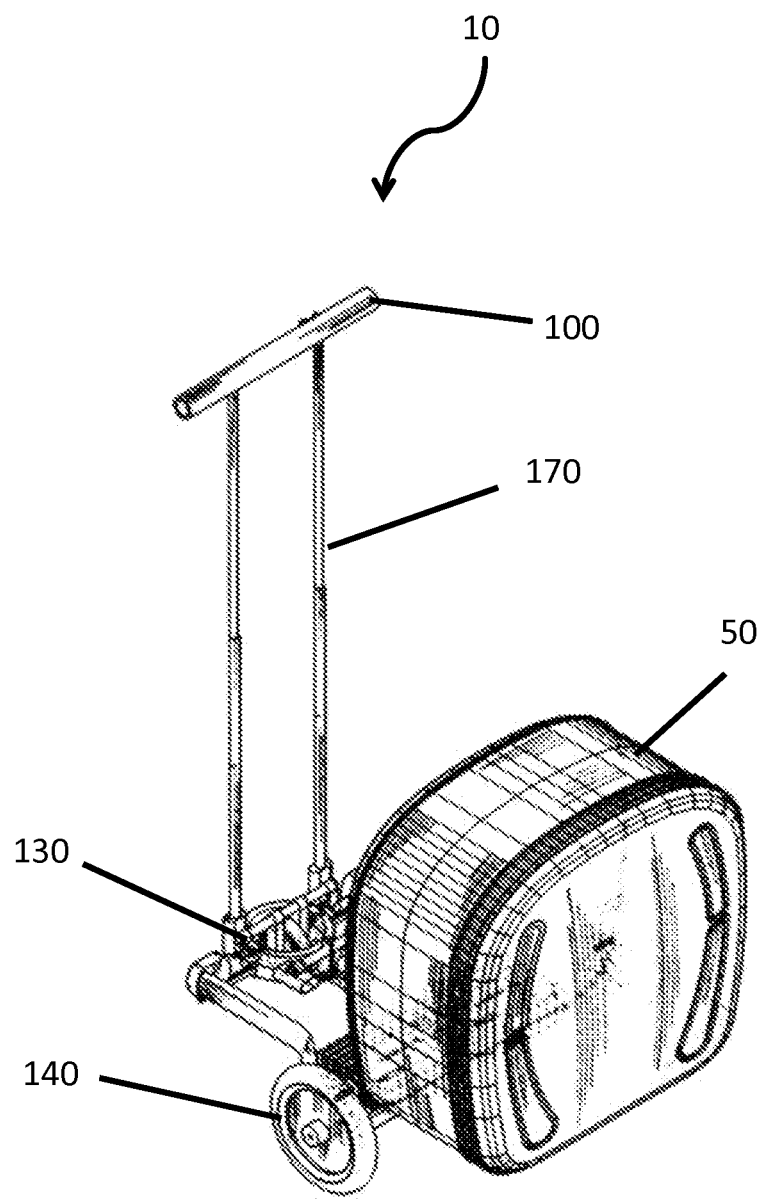
FIG. 9 illustrates another view of the hand truck of FIG. 8.
Figure 10:
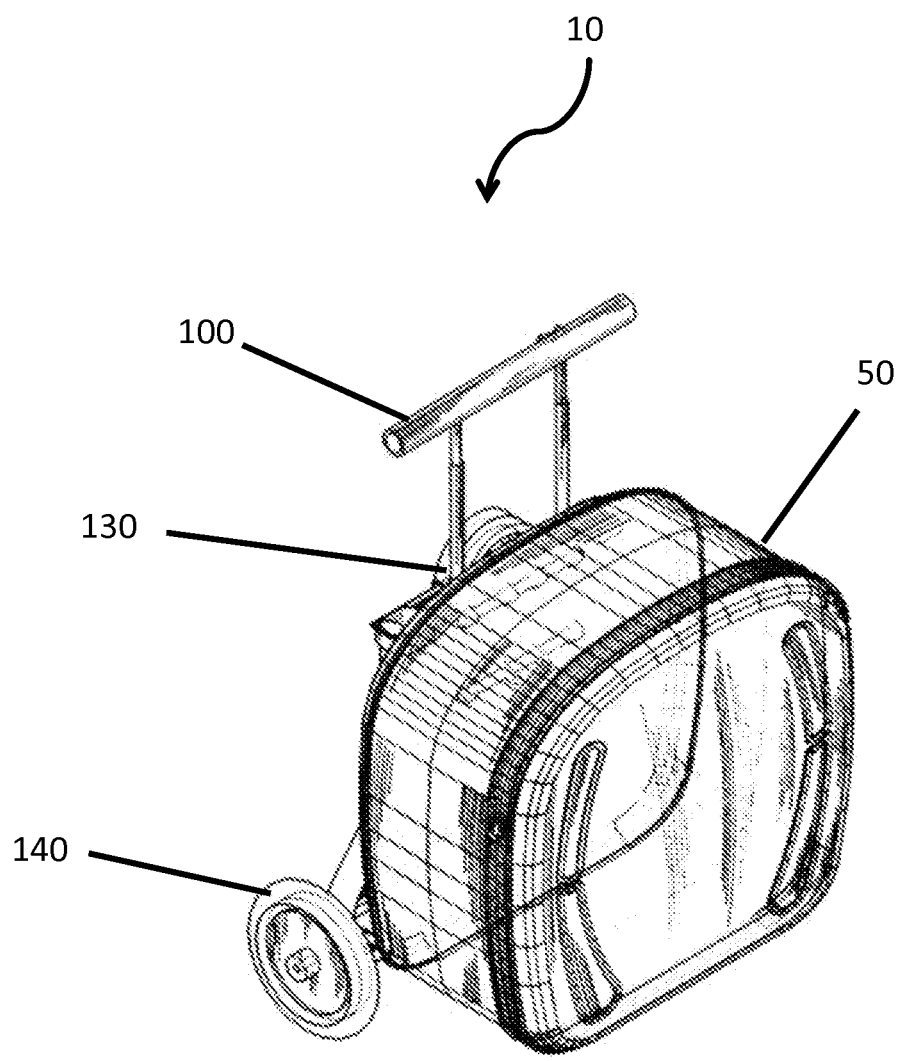
FIG. 10 illustrates the hand truck of FIG. 8 with the handle retracted.

A variation of the hand truck is illustrated in FIGS. 8-10. The hand truck 10 may include a frame 110, a telescopic handle 170, a handle bar 100, a front motorized wheel assembly 130, and back wheels 140. In addition, the hand truck 10 may include a bag, such as a luggage bag 50, attached to the frame 110 for carrying items.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:
1. A hand truck, comprising:
a frame;
a pair of back wheels secured to a first edge of the frame;
a nose plate hingedly secured to the first edge of the frame, the nose plate having a first nose plate position folded against a first side of the frame and a second nose plate position folded approximately 90° away from the first side of the frame;
a telescopic handle hingedly secured to a second edge of the frame opposite the first edge, the handle having a first handle position extending from the second edge of the frame and a second handle position substantially extending perpendicular to the first side of the frame;
a motorized front wheel assembly separately connected to the second edge of the frame and to the telescopic handle;
the hand truck having;
  a hand truck configuration in which the nose plate is in the second nose plate position, the frame is in a vertical position, and the telescopic handle is extended and in the first handle position;
  a storage configuration in which the nose plate is in the first nose plate position, the frame is in a vertical position, and the telescopic handle is retracted and in the first handle position; and
  a scooter configuration in which:
    the nose plate is in the first nose plate position, the frame is in a horizontal position, and the telescopic handle is extended and in the second handle position; and
    the motorized front wheel assembly is steerable by the telescopic handle;
the hand truck further comprising:
  an upper handle support connected to the motorized wheel assembly and rotatably connected to the telescopic handle;
  a lower handle support connected to the frame; and upper and lower lock pins removably secured through the telescopic handle, whereby:
when the upper and lower lock pins are removed from the telescopic handle, the telescopic handle is freely slidable through the upper and lower handle supports;
when the hand truck is in the hand truck and storage configurations, the upper and lower lock pins are removably secured through the telescopic handle above and below the lower handle supports; and
when the hand truck is in the scooter configuration, the upper and lower lock pins are removably secured through the telescopic handle above and below the upper handle supports.

2. The hand truck of claim 1, wherein the front motorized wheel assembly comprises:
an upper bearing cup secured to the frame;
a lower bearing cup secured to the upper handle support;
a bearing assembly inserted between the upper and bottom bearing cups;
a wheel within a circular opening formed by the upper and lower bearing cups; and
an electric motor within and mechanically coupled to the wheel, the motor secured to the lower bearing cup;
whereby the wheel is rotatable within the circular opening in response to rotation of the telescopic handle.

3. The hand truck of claim 1, further comprising bag secured to the frame.

* * * * *